(12) United States Patent
Baxter (10) Patent No.: US 10,091,464 B2
(45) Date of Patent: Oct. 2, 2018

(54) IMAGE/LOCATION-BASED TRACKING

(71) Applicant: 355323 B.C. Ltd., Richmond (CA)

(72) Inventor: Robert Baxter, Surrey (CA)

(73) Assignee: 355323 B.C. Ltd., Richmond, British Columbia (CA)

( * ) Notice: Subject to any disclaimer, the term of this patent is extended or adjusted under 35 U.S.C. 154(b) by 354 days.

(21) Appl. No.: 14/621,576

(22) Filed: Feb. 13, 2015

(65) Prior Publication Data

US 2016/0241815 A1 Aug. 18, 2016

(51) Int. Cl.
| | |
|---|---|
| *G07C 9/00* | (2006.01) |
| *G06Q 20/40* | (2012.01) |
| *G06F 21/32* | (2013.01) |
| *H04N 7/18* | (2006.01) |
| *G08B 13/196* | (2006.01) |
| *G06K 9/00* | (2006.01) |
| *G06K 9/32* | (2006.01) |

(52) U.S. Cl.
CPC ......... *H04N 7/181* (2013.01); *G06K 9/00771* (2013.01); *G08B 13/19608* (2013.01); *G08B 13/19645* (2013.01); *G06K 2009/3291* (2013.01)

(58) Field of Classification Search
CPC ............. H04N 7/18; H04N 7/173; G06K 9/46
USPC ....................................................... 348/159
See application file for complete search history.

(56) References Cited

U.S. PATENT DOCUMENTS

| | | | | |
|---|---|---|---|---|
| 7,634,662 | B2 * | 12/2009 | Monroe | G06K 9/00221 |
| | | | | 382/117 |
| 2007/0039030 | A1 * | 2/2007 | Romanowich | G08B 13/19608 |
| | | | | 725/105 |

* cited by examiner

*Primary Examiner* — Sathyanaraya V Perungavoor
*Assistant Examiner* — Patricia I Young
(74) *Attorney, Agent, or Firm* — Crawford Maunu PLLC (57) ABSTRACT

Aspects of the present disclosure are directed to tracking authorized individuals, and identifying the presence of unauthorized individuals. As may be consistent with one more embodiments, respective cameras capture images of regions of a common premises, and a filter circuit detects the presence of individuals in the images, and filters the detected presence as follows. The location of one or more authorized users are tracked relative to the premises via location-based information indicative of each authorized user's location. Each detected individual's location is identified and compared to the tracked location of the at least one authorized user. The detected individual is identified as being an unauthorized individual in response to the comparison indicating that the identified location is not common to the tracked location.

19 Claims, 3 Drawing Sheets

IMAGE/LOCATION-BASED TRACKING

FIELD

Aspects of various embodiments are directed to tracking authorized individuals and identifying the presence of unauthorized individuals.

BACKGROUND

Many video monitoring or surveillance systems use video cameras and/or motion sensing-type devices that help to monitor buildings, areas or premises in general. In many applications, video analytics are used as an effective strategy for detecting persons in normally unoccupied properties by monitoring alerts with video clips of human activity remotely from a monitoring center. Video monitoring, and particularly monitoring with analytics, can be cost effective and provide a quality result.

While video and other monitoring approaches can be useful, certain applications are challenging. For instance, where monitoring involves dynamic environments that may include continuous or intermittent access by individuals who are authorized or intended, detecting the presence of unauthorized individuals can be difficult. For instance, false alarms can be generated, or monitoring can be otherwise hindered when authorized individuals are or may be present. In addition, manual monitoring of video can be challenging to implement on a reliable basis.

These and other matters have presented challenges to tracking individuals, for a variety of applications.

SUMMARY

Various example embodiments are directed to circuits, systems and methods involving tracking, and their implementation.

According to an example embodiment, an apparatus includes a plurality of cameras that respectively capture images of regions of a common premises, and a filter circuit that detects the presence of individuals in the images and filters the detected presence as follows. The location of at least one authorized user is tracked relative to the premises via location-based information indicative of each authorized user's location. For each detected individual in the images, a location of the detected individual is identified and compared to the tracked location of the at least one authorized user. In response to the comparing indicating that the identified location is not common to the tracked location on the premises, identification of the detected individual as being an unauthorized individual is facilitated, such as by allowing an alarm system to proceed (e.g., allowing the system to operate in an enabled mode), or otherwise generating an alarm.

Another embodiment is directed to a method as follows. Images of regions of a common premises are captured via a plurality of cameras, and the presence of individuals in the images is detected. The detected presence is then filtered by tracking the location of at least one authorized user relative to the premises via location-based information indicative of each authorized user's location. For each detected individual in the images, a location of the detected individual is identified and compared to the tracked location of the at least one authorized user, and the detected individual is identified as being an unauthorized individual in response to the comparison indicating that the identified location is not common to the tracked location on the premises.

Another embodiment is directed to apparatus having a plurality of cameras respectively configured and arranged to capture images of regions of a common premises, and for each camera, a first circuit that detects the presence of an individual in one of the images captured by the camera and provides an output in response to detecting the presence of the individual. The apparatus also includes a second circuit that tracks the location of one or more authorized users relative to the premises via location-based information indicative of each authorized user's location, and that controls the output of the first circuit, for each of the cameras, based on the tracked location relative to a region of the common premises that the camera captures images from. In some implementations, the second circuit controls the output of the first circuit by inhibiting the output in response to the tracked location being indicative of an authorized user being in the image in which the presence of the individual is detected. Such an approach may involve disabling analytics in each camera, which operate to detect the individuals.

Another embodiment is directed to an apparatus including a remote circuit and a filter circuit. The remote circuit wirelessly communicates with a plurality of external signal sources, identifies the location of the remote circuit via the external signal sources, and transmits location-based information indicative of the identified location of the remote circuit. The filter circuit detects the presence of individuals in images of a common premises captured by a plurality of cameras, and filters the detected presence as follows. The location of the remote circuit is tracked relative to the premises, via the location-based information. For each detected individual in the images, a location of the detected individual is identified and compared to the tracked location of the at least one authorized user. In response to the comparison indicating that the identified location is not common to the tracked location on the premises, the detected individual is identified as being an unauthorized individual.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving detecting unauthorized users, and in doing so based on an identified location of any authorized user. In certain implementations, aspects of the present disclosure have been shown to be beneficial when used in the context of monitoring a premises that is guarded by authorized users or with environments in which both authorized and unauthorized users may be present. Such approaches may be implemented for disabling or pacifying an alarm system component in the presence of authorized users, and therein minimizing false alerts (e.g., in a video analytics type system), which can facilitate the use of video analytics in areas in which security patrols are performed. While not necessarily so limited, various aspects may be appreciated through a discussion of examples using such exemplary contexts.

Various example embodiments are directed to monitoring a premises such as an outdoor environment, building (or buildings) and combinations thereof. For instance, video analytics may be used in an outdoor environment to monitor the environment for the presence of unauthorized users, while the environment is also patrolled by authorized guards or otherwise used by authorized users. Alarm conditions are provided based on the presence or absence of authorized individuals, and/or the presence of an individual that is not identified as being an authorized individual (e.g., by detecting that the individual is not authorized, or otherwise being unable to verify that the individual is authorized).

According to a particular example embodiment, cameras are used to monitor a premises by capturing images of regions of the premises, and a filter circuit detects the presence of individuals in the images and filters the detected presence. When one or more authorized users are present on the premises, the location of the authorized user(s) is tracked relative to the premises. This tracking may, for example, involve using location-based information such as global positioning system (GPS) or Wi-Fi location information to identify each authorized user's location on and/or entering/leaving the premises. The location of each detected individuals is identified and compared to the tracked location, therein providing an indication of whether an authorized user is present in the same area as the identified individual in the images. For instance, it can thus be determined whether an authorized user is in field of view of a camera that detects the presence of an individual. If the identified location is not common to the tracked location on the premises (i.e., an authorized user in not in the identified location), the detected individual is identified as being unauthorized.

The filter circuit operates in a variety of manners to provide an indication of the presence of unauthorized individuals (or, e.g., individuals for which authorization cannot be verified). Where implemented with an alarm system, an alarm condition may thus be enabled or otherwise allowed to proceed under conditions in which no authorized user is present, or pacified/disabled when an authorized user is present. In some implementations, the filter circuit operates a security-based analytics protocol for detecting individuals in images, and pacifies execution of the security-based analytics protocol in response to the comparison indicating that the identified location is common to the tracked location of the authorized user. In some implementations, the security-based analytics protocol operates in a pacified mode, and operates in an active mode when the identified location is detected as being different than the tracked location of the authorized user.

In some embodiments, the filter circuit identifies the location of detected individuals based on a location and/or field of view of a camera that captures the image. For instance, GPS-based coordinates of the tracked location can be compared to coordinates of a specified area of the premises captured by the identified camera. In some embodiments involving such GPS-based tracking, individuals are detected as being unauthorized when the coordinates of an area monitored by the camera are different than coordinates of any detected authorized individual(s). In more particular embodiments, a security feature for each camera that captures a field of view of an area of the premises that includes tracked GPS coordinates of an authorized user is disabled during a time period in which the tracked GPS coordinates are present in the area. The security feature is re-enabled in response to the tracked GPS coordinates indicating that the authorized user moves out of the area of the premises. For instance, where several authorized users are present in a premises, the location of each authorized user can be tracked and compared to any identified locations of detected individuals.

Other embodiments involve further authorization components, which facilitate identifying individuals as being unauthorized in locations that are also occupied by an authorized user. In one embodiment, the filter circuit is responsive to the identified location being common to the tracked location on the premises by analyzing facial characteristics in the image of the detected individual relative to facial recognition data for the tracked authorized user. Other embodiments involve detecting other user-specific characteristics, such as biometric characteristics. The detected individual is identified as being unauthorized when the analysis of the facial characteristics fail to identify the detected individual as being an authorized user. For instance, where two or more individuals are detected in a particular location, facial characteristics of the individuals can be detected and used to determine if one of the users is not an authorized user. This approach may, for example, be used to alert an authorized individual that an unauthorized individual is also present.

As may be implemented with one or more embodiments above, some embodiments involve an apparatus or system that further includes a remote circuit (e.g., a mobile phone) that wirelessly communicates information to facilitate the aforementioned tracking. For instance, such a circuit may interface with external signal sources (e.g., Wi-Fi, cellular systems or GPS satellites), and identify the location of the remote circuit based on the interface. When the identified location matches location information characterizing the premises, the remote circuit transmits location-based information indicative of the identified location to the filter circuit. As such, the remote circuit may operate to provide information to the filter circuit when an authorized user having the circuit is present on the premises (e.g., and stop providing such information when the authorized user leaves the premises).

In certain embodiments involving tracking with a mobile phone, security guards or other authorized users carry a mobile telephone that is configured (e.g., with an application) that provides location characteristics, which can be activated or deactivated based on presence of the guard or user within a monitored premises. A list of authorized users and the identity of each user's telephone can be maintained and used to identify the location of the user. A known location or GPS-based coordinates of a field of view of each camera can be compared with a location provided by an authenticated phone in proximity to the camera. A security alert is pacified when the locations match. For instance, where each camera in a facility operates video analytics, or where a central controller operates analytics based on images captured by the cameras, the analytics of the appropriate camera or location can be pacified while maintaining monitoring activity at other cameras. Accordingly, when a guard or other authorized person leaves a particular area, analytics for that area can be re-enabled.

Various other embodiments are directed to methods as may involve the approaches characterized above with various apparatuses. Images of regions of a common premises are captured and the presence of any individual(s) in the images is detected and filtered based on tracked locations of one or more authorized users. Action is taken (or pacified) based on the detected presence and tracked locations, and a comparison between them. Security-based analytics protocols or other features can be initiated or pacified in response to detecting an individual in a location that is not occupied by an authorized individual. GPS or other tracking information can be used, together with known coordinates or a known field of view of a camera used to track the presence of unauthorized individuals. Facial analysis or other biometric-type characterizations can further be used to identify individuals, in connection with the above-discussed tracking and identification.

The various embodiments described herein may be implemented for a variety of applications. For instance, analytics can be used in sites requiring guarding to truly multiply the efforts of static guards in facilities requiring guard service. Such sites may include facilities subject to terrorist attack (e.g., nuclear plants, airports, water treatment facilities, power plants), and which may be the subject of homeland security. Other applications include construction work camps, mining sites and forestry sites where guards are involved.

Figure 1:
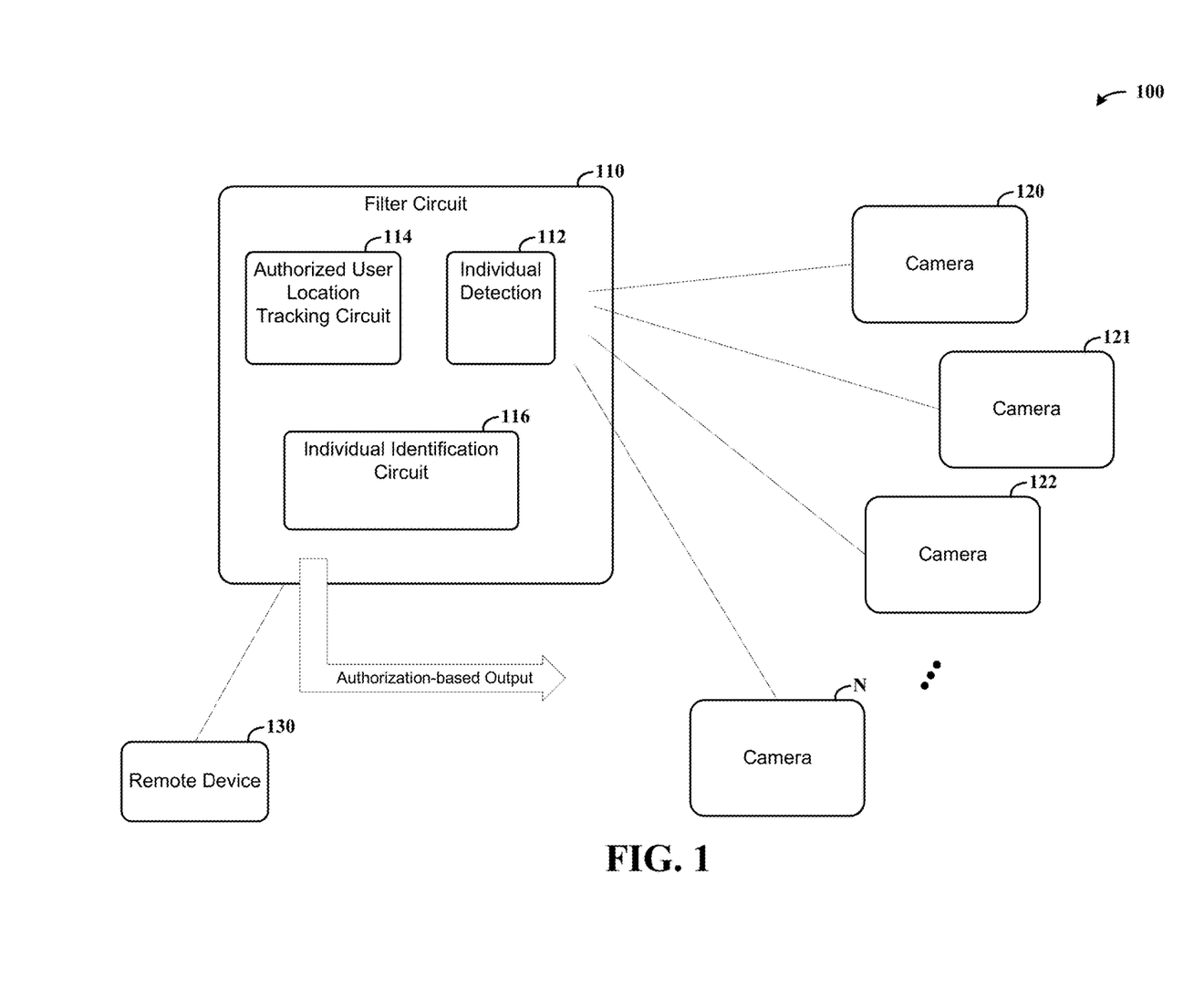
FIG. 1 shows an apparatus involving the detection of unauthorized individuals, in accordance with an example embodiment.

Turning now to the Figures, FIG. 1 shows an apparatus 100 involving the detection of unauthorized individuals, in accordance with an example embodiment. The apparatus 100 includes a filter circuit 110 that interacts with a plurality of cameras, with cameras 120, 121, 122 and N shown by way of example. In some implementations, the filter circuit 110 also interacts with a remote device 130 (which may be included with the apparatus 100 and/or as a system-type implementation), to obtain tracking information for authorized users.

The filter circuit 110 is shown having an individual detection component 112, an authorized user location tracking circuit 114 and an individual identification circuit 116. The individual detection component 112 detects the presence of individuals in images. The individual detection and/or identification may be carried out at respective cameras, at the filter circuit 110, or both. As such, analytics used to detect and/or identify individuals can be carried out at the cameras, filter circuit or both. In some implementations, some or all of the individual detection component 112 and/or the individual identification circuit 116 is included with each camera, which operate to detect the presence of an individual and transmit data indicative of the detected presence to the filter circuit 110. The filter circuit 110 can thus operate to enable or disable each camera, based upon tracking of authorized users. In other implementations, the cameras transmit images to the filter circuit 110, which carries out the presence identification within the individual detection circuit 112 as shown.

The authorized user location tracking circuit 114 operates to track or otherwise provide data indicative of the location of authorized users. This may involve, for example, interacting with remote device 130 (or several such remote devices) used to track the location of authorized users. In some implementations, the authorized user location tracking circuit 114 stores the coordinates of each camera's field of view and other arming parameters, and operates to disable any alarm output accordingly (e.g., at the filter circuit 110 or by disabling cameras). Accordingly, individual cameras can be disarmed based on location of tracked individuals, or outputs of individual cameras can be ignored, discarded or otherwise not taken action upon at the filter circuit 110.

The individual identification circuit 116 operates with the individual detection component 112 and the authorized user location tracking circuit 114 to determine whether individuals that are detected via the cameras are in an area in which an authorized user is tracked as being in the area. In some implementations, the individual identification circuit 116 accesses and/or maintains data indicative of authorized users.

In some implementations, the filter circuit provides an authorization-based output, based upon the comparison. This output may, for example, involve one or more aspects consistent with the above discussion. In some implementations, the output is a pacification output that pacifies an alert system, such as by pacifying an automated alert generated within one of the cameras. In other implementations, the output includes an alert that is provided based on identifying the presence of an individual in an area in which an authorized individual is not present.

Figure 2:
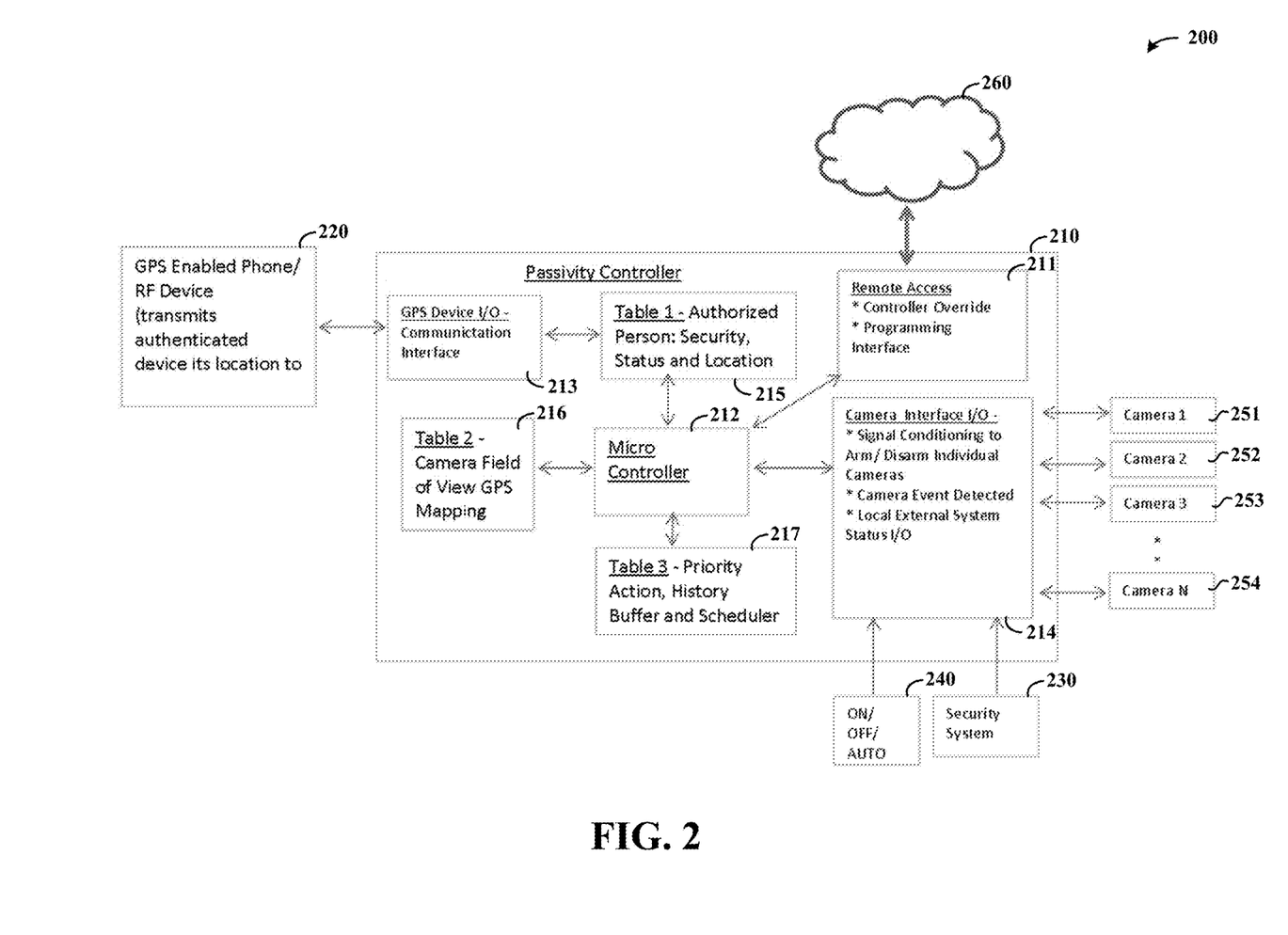
FIG. 2 shows an apparatus for passivating presence-based circuitry, in accordance with another example embodiment.

FIG. 2 shows an apparatus 200 for passivating presence-based circuitry, in accordance with another example embodiment. The apparatus 200 may, for example, be implemented in accordance with the apparatus 100 in FIG. 1. The apparatus 200 includes a passivity controller 210 that interacts with GPS enabled devices (one device 220 is shown by way of example), a security system 230, an on/off controller 240 and multiple cameras 251-254. The passivity controller operates using approaches, such as those described above, in which the location of authorized individuals is tracked and used in controlling the operation of a security-based alert function. In some implementations, the passivity controller 210 operates to passivate a security alert generated by the cameras, where the cameras operate using video analytics to analyze and present an alert based on the detection of an individual in an image.

The passivity controller has a remote access component 211, a microcontroller 212, a GPS device interface 213 that interfaces with the GPS enabled device 220, and a camera interface 214 that interfaces with each camera. The microcontroller interacts with tables 215, 216 and 217, which respectively store information pertaining to tracked locations of authorized individuals (215), GPS mapping of camera fields for each camera (216), and a priority action, history buffer and scheduler (217). Each of the shown components are implemented in circuitry within the passivity controller 210.

The remote access component 211 provides controller override and a programming interface for interfacing with a remote controller via a network type link 260 (e.g., a wireless link). This programming may involve, for example, establishing information in the tables, installing security protocols and passivation/activation conditions.

The microcontroller 212 interacts with the camera interface 214, based on information in the tables 215, 216 and 217. The camera interface 214 operates with the microcontroller 212 as well as the security system 230 and on/off controller 240, and facilitates signal conditioning to arm/disarm individual ones of the cameras, provide an indication of detected events, and provide local external system status (e.g., note whether a camera and/or the overall security system is active/operational).

In some embodiments as may be carried out with the apparatus 200 or other embodiments above, a log of one or more authorized individual's movements is recorded and used to provide tracking. Where implemented with a security patrol, such an approach provides an audit trail of security officers or guards carrying out the patrol.

The GPS-enabled device 220 transmits its GPS location using one or more of a variety of approaches, such as over a Wi-Fi channel established with the passivity controller 210, or using a cellular upload via the internet to a service that transmits periodically to the passivity controller as the GPS device moves. In some implementations, the GPS-enabled device is a mobile phone with an app that is configured for one or more protected sites. Such an app may operate the GPS-enabled device to transmit only when the device is moving in proximity to a site or sites to be protected. In some implementations, the GPS-enabled device 220 maintains a location of an on premise guarding command center, and arms nearby cameras when a guard carrying the device is present at the command center.

Figure 3:
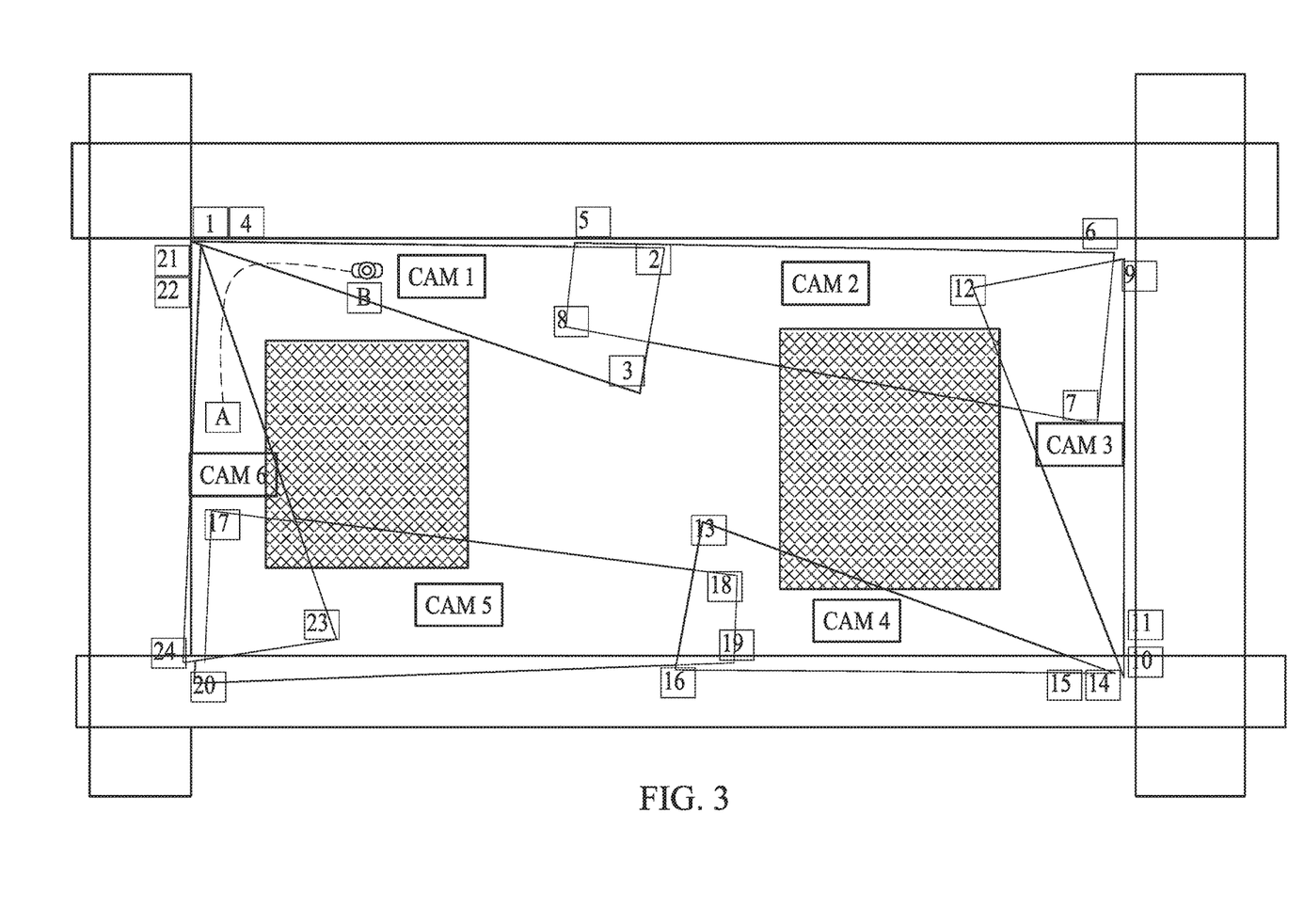
FIG. 3 shows an apparatus and related environment, involving the detection of unauthorized individuals, in accordance with an example embodiment.

FIG. 3 shows another apparatus 300 and related environment, involving the detection of unauthorized individuals, in accordance with an example embodiment. The apparatus 300 may, for example, be implemented in accordance with the apparatus 100 or the apparatus 200 as described above. A filter circuit 310 includes detection, tacking and identifying components 311, 312 and 313, that respectively detect the presence of an individual, track authorize individuals, and identify the detected individual as authorized or unauthorized based on the tracking. The filter circuit 310 thus may, for example, carry out approaches for detecting, tracking and identifying as described with other embodiments above.

The filter circuit 310 interacts with multiple cameras, with cameras 1-6 (cam 1-cam 6) shown by way of example. Each camera monitors regions of a premises that are bounded as shown at 330, 331, 332 and 333 (e.g., as a fence, walls or streets), with exemplary regions or buildings 320 and 322 shown within the premises. Fields of view are shown for each camera, with GPS coordinates labeled by way of example for each field of view. For instance, the field of view for CAM 1 is represented by GPS coordinates 1, 2, 3, and 4. These coordinates can be used relative to coordinates detected for authorized users, and compared accordingly when the presence of a user is detected within the coordinates.

By way of example, when a guard patrols the premises by moving from location "A" to location "B," a GPS device (e.g., mobile telephone) carried by the guard transmits the guard's GPS location. This location is used to pacify a security function of CAM 6 while the guard is at location "A" and within the field of view of CAM 6, and cease pacifying the security function of CAM 6 when the guard moves out of the field of view. As the guard arrives at location B, a security function of CAM 1 is pacified.

In a particular embodiment, a controller as described above is enabled with three or more guarding modes that can be activated by schedule, arming by building security status or overridden remotely. The guarding modes can be operated as: disarmed, normally occupied with periodic tours when occupied, unoccupied to detect all unauthorized entry. Dynamic changing of guarding is thus provided as normal occupants may arrive late to disarm or leave early, and the system can be armed early. Dynamic arming can also provide variations to regular open and closings or other security timing aspects relating to occupancy.

Various embodiments involve a graphical user interface that is provided to manage setup and ongoing adjustment as user preferences change. Such an interface may be provided via a mobile telephone as discussed herein. Further, changes in modes can be communicated for additional monitoring aspects.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., filter, tracking, detection, or identification). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, various different types of location-based identification can be used alone or in combination, such as those involving GPS, Wi-Fi and other wireless signals. In addition, embodiments relating to facilitating, disabling or enabling can be carried out in other manners to provide the resulting function. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
   a plurality of cameras respectively configured and arranged to capture images of regions of a common premises; and
   a filter circuit configured and arranged to detect presence of individuals in the images, and to filter the detected presence by tracking the location of at least one authorized user relative to the common premises, by communicating with a global-positioning system (GPS) location-based communication circuit carried by the at least one authorized user to obtain information including GPS coordinates indicative of the at least one authorized user's location, the location-based information identifying a real-time location of the at least one authorized user as the user moves through fields of view of the cameras, and for each detected individual in the images:
identifying a location of the detected individual from one of the images in which the individual is detected, and identifying an instant in real time at which the individual is detected in the one of the images, comparing, the identified location and the time of the location of the detected individual from one of the images and the tracked real-time location and time of the at least one authorized user, and in response to the comparison indicating that the identified location is not common to the tracked location on the common premises at a common point in real time, facilitating identification of the detected individual as being an unauthorized individual and disabling a security feature of one of the cameras that captured the one of the images in which the individual is detected by, for each camera that captures a field of view of an area of the common premises that includes tracked GPS coordinates of the at least one authorized user, disabling the security feature during a time period in which the tracked GPS coordinates are present in the area.

2. The apparatus of claim 1, wherein the filter circuit is configured and arranged to:

track the location of the at least one authorized user by using the location-based information to track the at least one authorized user as the user moves about the common premises independently from the captured images and any identification of the at least one authorized user provided therefrom, initiate a security-based analytics protocol in response to detecting an individual in one of the captured images, and pacify execution of the security-based analytics protocol in response to the comparison indicating that the identified location is common to the tracked location of the authorized user.

3. The apparatus of claim 1, wherein the filter circuit is configured and arranged to filter the detected presence by tracking the location of the at least one authorized user by identifying the at least one authorized user as being present within GPS-based coordinates of a specified area of the common premises captured by one of the plurality of cameras, and facilitating identification of the detected individual as being an unauthorized individual by detecting that the one of the plurality of cameras capturing the image of the detected individual is different than the camera that captures said specified area.

4. The apparatus of claim 1, wherein the filter circuit is configured and arranged to, for each camera that captures the field of view of an area of the common premises that includes tracked GPS coordinates of the at least one authorized user, re-enable the security feature in response to the tracked GPS coordinates of the at least one authorized user moving out of the area of the common premises.

5. The apparatus of claim 1, wherein the filter circuit is configured and arranged to initiate a security-based analytics protocol in response to the identified location being different than the tracked location of the at least one authorized individual.

6. The apparatus of claim 1, wherein the filter circuit is configured and arranged to track the location of the at least one authorized user by tracking respective locations of a plurality of authorized users that are located in the common premises, by using respective GPS-based communication circuits carried by each of the authorized users, compare the identified location of the detected individual to the tracked location by comparing the identified location against all of the plurality of authorized users that are tracked as being located in the common premises, and facilitate identification of the detected individual as being an unauthorized individual in response to the comparison indicating that the detected individual is not in any one of the respective locations.

7. The apparatus of claim 1, wherein the filter circuit is configured and arranged to, in response to the comparison indicating that the identified location is common to the tracked location on the common premises:

analyze facial characteristics in the image of the detected individual relative to facial recognition data for the at least one authorized user, and facilitate the identification of the detected individual as being an unauthorized individual in response to the analyzing of the facial characteristics failing to identify the detected individual as being the at least one authorized user.

8. The apparatus of claim 1, further including a remote circuit configured and arranged to:

wirelessly communicate with a plurality of external signal sources and identify therefrom the location of the remote circuit, compare the identified location of the remote circuit with location information characterizing the common premises, and transmit location-based information, including information indicative of the identified location of the remote circuit, to the filter circuit based on the comparing indicating that the remote circuit is on the common premises.

9. A method comprising:

capturing images of regions of a common premises via a plurality of cameras;

detecting presence of individuals in the images; and filtering the detected presence by tracking the location of at least one authorized user relative to the common premises, by communicating with a GPS (global positioning system) location-based communication circuit carried by the at least one authorized user to obtain information including GPS coordinates indicative of the at least one authorized user's location, in real time as the at least one authorized user moves through fields of view of the cameras, and for each detected individual in the images:
identifying a location of the detected individual from one of the images in which the individual is detected, comparing the identified location of the detected individual to the tracked location of the at least one authorized user in a field of view in the one of the images at a common point in time, therein providing an indication of whether the detected individual is in the same location as the tracked at least one authorized user, and in response to the comparison indicating that the identified location is not common to the tracked location on the common premises, facilitating identification of the detected individual as being an unauthorized individual, and in response to the comparison indicating that the GPS coordinates are in identified location, disabling a security feature of one of the cameras that captured the one of the images in which the individual is detected for a time period in which the GPS coordinates indicate that the at least one authorized user is in the field of view of the one of the cameras.

10. The method of claim 9, further including:

initiating a security-based analytics protocol in response to detecting an individual in one of the captured images, thereby providing identification of the at least one user and the at least one user's location independent from any facial recognition, and pacifying execution of the security-based analytics protocol in response to the comparison indicating that the identified location is common to the tracked location of the authorized user.

11. The method of claim 9, wherein identifying the location of the detected individual includes identifying a camera by which the image of the detected individual was taken, and comparing the identified location of the detected individual to the tracked location of the at least one authorized user includes comparing GPS-based coordinates of the tracked location of the at least one authorized user with GPS-based coordinates of a specified area of the common premises captured by the identified camera.

12. The method of claim 9, wherein tracking the location of the at least one authorized user includes identifying the at least one authorized user as being present within GPS-based coordinates of a specified area of the common premises captured by one of the plurality of cameras, and facilitating identification of the detected individual as being an unauthorized individual includes detecting that the camera capturing the image of the detected individual is different than the one of the plurality of cameras that captures said specified area.

13. The method of claim 9, including:

disabling a security feature for each camera that captures a field of view of an area of the common premises that includes tracked GPS coordinates of the at least one authorized user, during a time period in which the tracked GPS coordinates are present in the area, and re-enabling the security feature for each camera for which the security feature has been disabled, in response to the tracked GPS coordinates of the at least one authorized user moving out of the area of the common premises.

14. The method of claim 9, further including initiating a security-based analytics protocol in response to the identified location being different than the tracked location of the at least one authorized individual.

15. The method of claim 9, wherein:

tracking the location of the at least one authorized user includes tracking respective locations of a plurality of authorized users that are located in the common premises, using respective GPS-based communication circuits carried by each of the authorized users, comparing the identified location of the detected individual to the tracked location includes comparing the identified location against all of the plurality of authorized users that are tracked as being located in the common premises, and facilitating identification of the detected individual as being an unauthorized individual includes identifying the individual as being unauthorized in response to the comparison indicating that the detected individual is not in any one of the respective locations.

16. The method of claim 9, further including, in response to the comparison indicating that the identified location is common to the tracked location on the common premises:

analyzing facial characteristics in the image of the detected individual relative to facial recognition data for the at least one authorized user, and facilitating the identification of the detected individual as being an unauthorized individual in response to the analyzing of the facial characteristics failing to identify the detected individual as being the at least one authorized user.

17. An apparatus comprising:

a plurality of cameras respectively configured and arranged to capture images of regions of a common premises;

for each camera, a first circuit configured and arranged to detect presence of an individual in one of the images captured by the camera, and to provide an output in response to detecting the presence of the individual; and a second circuit configured and arranged to:

track the location of at least one authorized user relative to the common premises via real-time GPS (global positioning system) location-based information including GPS coordinates indicative of each authorized user's location in a field of view of at least one of the cameras, by communicating with a GPS-based communication circuit carried by the at least one authorized user and obtaining the GPS coordinates therefrom, and for each of the cameras, control the output of the first circuit based on the tracked location relative to a region of the common premises that the camera captures images from at a common point of time at which the authorized user's location is tracked, by disabling the output of the first circuit for a time period during which the GPS coordinates are in the field of view of an area of the common premises that is featured in the one of the images.

18. The apparatus of claim 17, wherein the second circuit is configured and arranged to control the output of the first circuit by inhibiting the output in response to the tracked location being indicative of an authorized user being in the image in which the presence of the individual is detected in the field of view of the camera capturing the image.

19. An apparatus comprising:

a remote circuit configured and arranged to wirelessly communicate with a plurality of external signal sources and identify therefrom the location of the remote circuit using GPS-based coordinates, and to transmit location-based information indicative of the identified location of the remote circuit; and a filter circuit configured and arranged to detect presence of individuals in images of a common premises captured by a plurality of cameras, and to filter the detected presence by tracking the real-time location of an authorized user associated with the remote circuit by tracking the location of the remote circuit relative to the common premises via the GPS-based coordinate location-based information, as the remote circuit is carried through the premises by the authorized user, and for each detected individual in one of the images:

identifying a location of the detected individual in the image, comparing the identified location of the detected individual to the tracked location of the authorized user carrying the remote circuit at a common instance in real-time, and in response to the comparison indicating that the identified location is not common to the tracked location on the common premises at a common instant in time, facilitating identification of the detected individual as being an unauthorized individual, and in response to the comparison indicating that the identified location is common to the tracked location at a common instance in time, disabling a security feature associated with one of the cameras that captured the one of the images in which the individual is detected, during a time period in which the real-time location of the remote circuit coincides with a field of view of an area of the common premises that is imaged by the camera that captured the image in which the individual is detected.

* * * * *